US005815604A

United States Patent [19]

Simons et al.

[11] Patent Number: 5,815,604
[45] Date of Patent: Sep. 29, 1998

[54] INTERACTIVE IMAGE MANIPULATION

[75] Inventors: Paul R. Simons, Crawley; Octavius J. Morris, Redhill, both of England

[73] Assignee: U.S. Philips Corporation, New York, N.Y.

[21] Appl. No.: 635,340

[22] Filed: Apr. 19, 1996

[30] Foreign Application Priority Data

May 18, 1995 [GB] United Kingdom .................. 9510093

[51] Int. Cl.$^6$ ..................................................... G06T 5/50
[52] U.S. Cl. .......................... 382/250; 382/248; 358/433; 348/422; 348/400
[58] Field of Search ..................................... 358/432–433; 382/248, 250, 239; 348/395, 400, 403, 414, 422, 468

[56] References Cited

U.S. PATENT DOCUMENTS

| 5,253,056 | 10/1993 | Puri et al. ................................ 358/133 |
| 5,444,489 | 8/1995 | Truong et al. ........................... 348/422 |
| 5,568,598 | 10/1996 | Mack et al. ............................... 395/133 |

FOREIGN PATENT DOCUMENTS

| 0566092A2 | 10/1993 | European Pat. Off. ......... H04N 4/45 |
| 0572024A | 12/1993 | European Pat. Off. ......... G06F 3/147 |
| 527746A | 2/1993 | Japan ............................... G09G 5/36 |
| 527747A | 2/1993 | Japan ............................... G09G 5/36 |
| 9421079 | 9/1994 | WIPO ............................. H04N 5/262 |

OTHER PUBLICATIONS

Chang et al., "Manipulation and Compositing of MC–DCT Compressed Video", IEEE Journal on Selected Areas in Communications, vol. 13, No. 1, Jan. 1995, pp. 1–11.

Primary Examiner—David K. Moore
Assistant Examiner—Stephen Brinich
Attorney, Agent, or Firm—Edward W. Goodman

[57] ABSTRACT

In a decoder/display system, a pre-processing stage (10) re-codes intra coded macroblock data in an image to produce an independent representation which observes byte alignment. Macroblock data is stored in structured form (26) so that it may readily be indexed for fast copying into foreign images. To avoid differential coding problems, two separate representations of each macroblock are generated for use as the first in a line of macroblocks or as part of a continuation of a line of macroblocks. The pre-processing stage may be used to combine separately encoded pictures and also to separate sprites (objects having a defined boundary) from their original scene. The content of the pictures may be changed at run-time by choosing combinations of macroblocks in a sequence of images to produce the desired effect. Pre-processed macroblocks are loaded into memory (26) as primitive sprites or whole encoded pictures to provide a database of MPEG (or similar) image data which may be interactively introduced and moved within an MPEG sequence. The provision of the database enables a system to generate a variety of interactive effects, including the introduction of sprites and other separately encoded data to the scene, the modification of motion vectors immediately prior to decoding that allow video animation within the scene, and the run-time scrolling of large image backgrounds.

9 Claims, 4 Drawing Sheets

INTERACTIVE IMAGE MANIPULATION

BACKGROUND OF THE INVENTION

1. Field of the Invention

The present invention relates to the modification of video images and in particular to the enabling of interactive manipulation of predictively coded images in a decoder stage.

2. Description of the Related Art

In the following, the invention will be described principally in terms of the MPEG 1 coding scheme as defined in ISO 11172, although it will be recognized that it is equally applicable to other hybrid-DCT (discrete cosine transformation) based coding schemes, such as the H.261 standard for video-telephony.

MPEG and H.261 are digital systems conventionally used for storing and compressing natural picture sequences, with the decoders being designed to interpret such encoded data and reproduce the same original sequence of images. The MPEG system defines a grid of macroblocks, each consisting of 16 pixels by 16 lines: these macroblocks are the basic unit of coding. Three main picture types are defined in MPEG, namely intra-pictures, predicted pictures and interpolated pictures; these are generally referred to as I-, P- and B-pictures, respectively.

Within a picture type, a macroblock may be coded in one of a number of different ways: two basic macroblock coding modes from the MPEG standard are the "intra mode" and the "motion compensated, not coded modes". In the intra mode, the address of the macroblock describes which macroblock is represented, followed by the macroblock type, and the DCT coefficient data for the pixel values. In the motion compensated mode, the information following the address and type information is a motion vector for the macroblock. The motion vector provides a displacement from the address of the current macroblock in the current picture to a pixel and line address on the previous picture from where it is copied to the current picture. Intra-coded macroblocks may be used in predicted pictures to introduce image blocks that are not present in the previous frame.

The MPEG encoding scheme is designed to efficiently store intra coded macroblocks in a minimal number of bits, and the specification is designed to allow encoders to pack macroblocks tightly together without observing byte alignment restrictions. Differential coding is also employed between neighbouring macroblocks to carry over specific coded values.

Some of the problems of manipulating data in schemes such as MPEG and H.261 are described with reference to the formation of composite image screens for video conferencing in a paper entitled "Manipulation and Compositing of MC-DCT Compressed Video" by Shih-Fu Chang and David G. Messerschmitt, IEEE Journal on Selected Areas in Communications, Vol. 13, No. 1, January 1995, pp.1–11. Their approach to the problems of compositing involves the provision of a combiner unit which receives the separate motion-compensated DCT signals, partially decodes each to remove the motion compensation, forms a composite image within the transform domain, and then re-applies a degree of motion compensation such as to provide a suitable signal to a conventional MC-DCT decoder (i.e., at a conference terminal). The system is discussed in further detail in International Patent Application WO94/21079, corresponding to U.S. Pat. No. 5,408,274, for which Chang and Messerschmitt are among the inventors.

The constraints imposed by features of schemes such as MPEG have the side effect of making it difficult to manipulate and edit the image data at speed such as to allow user manipulation of images in real-time. For example, it is not a simple matter to extract a macroblock from one picture and replace it in another, as that macroblock will be coded in terms of (among others) its position with respect to other macroblocks of the original picture.

SUMMARY OF THE INVENTION

It is therefore an object of the present invention to simplify the manipulation of such images. It is a further object to enable such manipulation in real-time and to realize the same in a decoder device having a relatively limited processing capability, for example, a Compact Disc Interactive (CD-i) player.

In accordance with the present invention there is provided an interactive image manipulation apparatus having an input for discrete cosine transform (DCT) coded macroblocks of pixel data and comprising: an image data cache; a pre-processing controller operable to process received macroblock data so as to generate at least two independent representation of each macroblock for use as a first or a continuation macroblock, respectively, in a line of macroblock data in an assembled image, to store said representations in the cache, and to generate a DCT coded image from selected ones of said representations read from the cache; user input means coupled to the controller, a selection of stored macroblock representations in the generated image being at least partially determined by input from the user input means; and a decoder arranged to receive and decode the generated DCT coded image. Suitably, a display coupled with said decoder and operable to receive and display the decoded image is also provided.

Also in accordance with the present invention there is provided a method for interactive manipulation and decoding of DCT coded macroblocks of pixel data comprising the steps of:

pre-processing the coded macroblock data such as to generate a database of macroblock data containing at least two independent representation of each macroblock for use as a first or a continuation macroblock, respectively, in a line of macroblock data in an assembled image;

assembling a DCT coded image from selected ones of said macroblock representations, with the selection of macroblocks to form the image being made at least partially in response to user input; and DCT decoding the assembled image.

The method and apparatus exploit the availability of macroblocks together with the motion compensation, available within schemes such as MPEG, to create images just before decoding, to update the screen. The method is efficient enough to enable the interactive animation of MPEG at run-time, even in relatively lower powered systems such as CD-i. This may typically be observed as the animation of picture sprites or the scrolling of a large MPEG background. In effect, it allows a variety of new special video effects to be produced by the suitable modification of MPEG data that allows images to be interactively redefined.

The advantage of performing picture manipulation on encoded data just prior to decoding is that a dramatic change to the representation of the screen is possible by the variation or introduction of some simple codes within the picture. In the case of MPEG, this is made possible by the definition of the MPEG coding scheme which uses motion vectors to copy data from previous frames rather than explicitly coding each frame uniquely.

Further features of the present invention are defined in the attached claims, the disclosure of which is incorporated herein by reference and to which reference should now be made, and in the following exemplary embodiments.

BRIEF DESCRIPTION OF THE DRAWINGS

Preferred embodiments of the present invention will now be described in terms of the MPEG system by way of example only, and with reference to the accompanying drawings, in which.

DESCRIPTION OF THE PREFERRED EMBODIMENT

The present invention overcomes the problems of macroblock manipulation by introducing a pre-processing step. This scheme works by recoding the intra-coded macroblock data in an image to produce an independent representation which observes byte alignment. Macroblock data is stored in structured form so that it may readily be indexed for fast copying into foreign images. The differential coding problem is also resolved by employing a solution which defines two separate representations of each macroblock for use when it is used as the first in a line of macroblocks or as part of a continuation of a line of macroblocks, as will be described below. This pre-processing scheme may be used to combine separately encoded pictures and also to separate sprites (objects having a defined boundary) from their original MPEG scene.

The MPEG system provides a display plane which may be used to display sequences of digitally encoded pictures. The modification of macroblocks and use of the MPEG display plane as a graphics control language at run-time can produce powerful interactive video effects. This is possible by the selection and manipulation of the picture building blocks over a sequence of frames.

The content of the pictures may be changed at run-time by choosing combinations of macroblocks in a sequence of images to produce the desired effect. Pre-processed macroblocks are loaded into memory as primitive sprites or whole encoded pictures to provide a database of MPEG image data which may be interactively introduced and moved within an MPEG sequence. The provision of the database enables a system to generate a variety of interactive MPEG effects, including the introduction of MPEG sprites and other separately encoded data to the scene, the modification of motion vectors immediately prior to decoding that allow video animation within the scene, the run-time scrolling of large image backgrounds, and the interactive combination of separate sections of MPEG into mosaic pictures, which may be put into an animated sequence. The generation of these effects will now be considered in greater detail.

Figure 1:
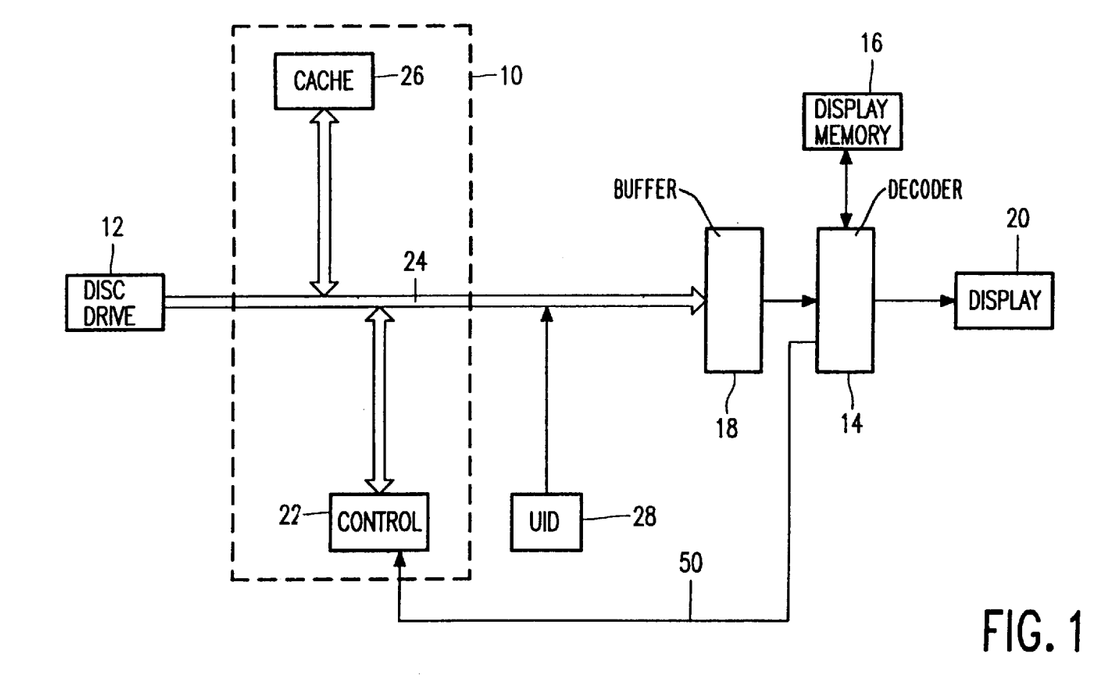
FIG. 1 is a block schematic diagram of a decoder apparatus embodying the invention.

A decoder apparatus with the pre-processing stage 10 is shown in FIG. 1. In addition to the pre-processing stage, the apparatus comprises a source of MPEG image data (disc drive 12 in this example), a decoder stage 14 with associated display memory 16 and preceding buffer 18, and a display 20 such as a cathode ray tube monitor. The MPEG data from source 12 is passed to a pre-processing controller 22 via a data bus 24. Following pre-processing (to be described in detail below), the controller loads two independent representations of each macroblock into a cache memory 26 at memory locations determined by the pre-processing, such that the cache memory 26 contains a database of MPEG image data.

In use, the controller 22 selects, from the database, the macroblocks to form a displayed image in dependence on the effect desired and with reference to a received input from a user input device (UID) 28. For example, where the desired effect is the run-time scrolling of a large image background, the user input would determine the direction and/or speed of the scrolling movement. The UID is suitably a mouse or track-ball device which, via the controller 22, may provide a movable cursor appearing on the display 20 in known manner: other forms of UID, such as a keyboard with up, down, left, right shift keys, or a graphics tablet and pen could alternatively be used.

In order to display objects (sprites) on a screen and move them around, the data representing a number of objects is stored, in MPEG coded form in the database mentioned above. The sprites can be created on screen by inserting them into a sequence of MPEG encoded pictures against a plain background, and can be moved on the screen from picture to picture using the vector update models that MPEG provides. A small amount of information, easily calculated just before decoding, is required to update the screen. Provided that certain restrictions are observed about the placement of objects on the screen (described below), it is possible to define and move objects around the screen interactively.

Figure 2:
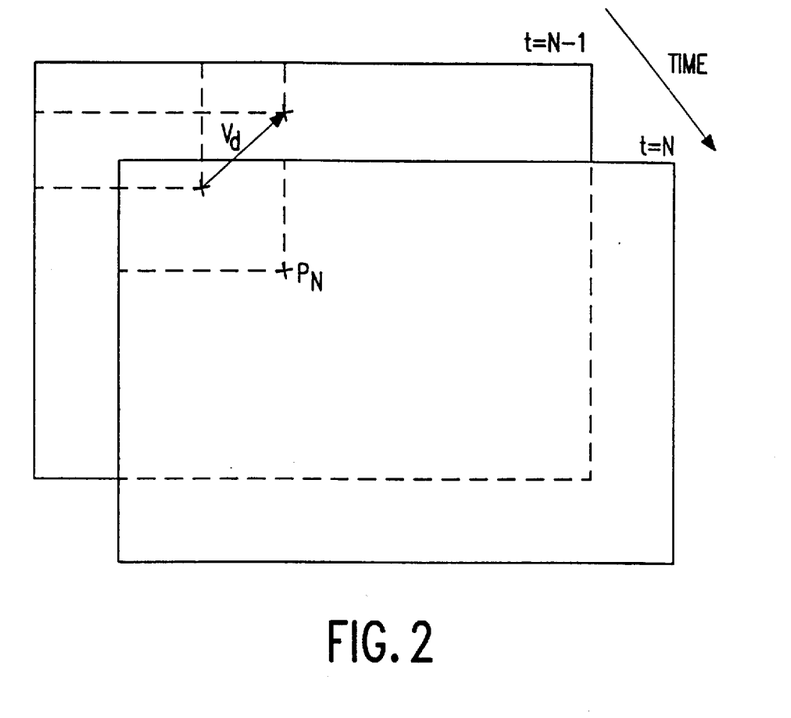
FIG. 2 shows the determination of moving object position over successive pictures.

For the manipulation of a single sprite on a screen, the two modes (intra and motion-compensated, not-coded) are used as follows. The shape and pixel values of a basic object occupying one or more macroblocks are identified and those macroblocks are stored as intra-type macroblocks in the cache 26 (FIG. 1). In subsequent pictures, the position of the object can be changed as shown in FIG. 2. The Figure shows successive screens at time t=N−1 and t=N. The required new position $P_N$ of a reference point X at t=N is determined, and the displacement between the position of the reference point in the last picture (displacement vector $V_d$ at t=N−1) is calculated and encoded in the vector format defined by MPEG. Using knowledge of the size, shape and the new position of the reference point of the object 30 (FIG.3), the number and position of the macroblocks 32, 34, 36 that it will partially occupy is calculated. These macroblocks are encoded in a P-picture as motion-compensated, not-coded macroblocks using the calculated displacement vector $V_d$. In this mode, no DCT data is required. Other macroblocks in the picture may be coded as "skipped" macroblocks for greatest efficiency except for those macroblocks which contain part or all of an object in the previous picture but contain none of it in the present picture. These macroblocks are most easily coded as an intra macroblock representing the background color. Other coding options are possible for these blocks.

Figure 3:
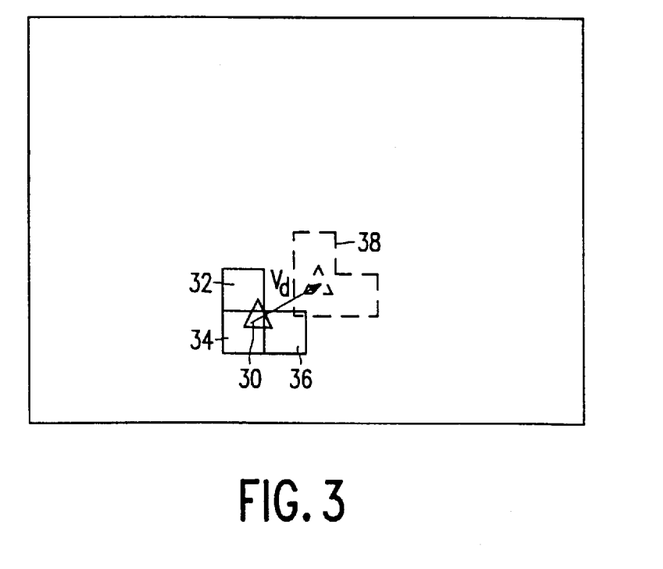
FIG. 3 represents the application of a macroblock exclusion zone for moving objects.

Multiple objects may be moved in the same way as single objects, although there are some extra complications which may be introduced because of possible interactions between objects. As it is only possible to transmit one vector pointing to the previous picture per macroblock, which vector points to a 16×16 area of the previous picture, objects should be constrained not to occupy the same macroblock. This constraint is implemented by defining an exclusion zone 38 around each object 30 that another object should not enter, as shown in FIG. 3. With this limitation, multiple objects in the scene can be managed as easily as single objects.

Considering now the run-time scrolling of an MPEG video background scene, such a scene may typically be taken from a high resolution fixed picture of a landscape or map containing a relatively high level of detail. With current MPEG encoders, limiting the area of pictures that can be encoded (typically to 352×288 or 768×144 pixels) such as to allow them to be decoded in real-time, a large and/or detailed image is suitably processed in sections with the pre-processing stage applying the recombination, as described below. As will be recognized, however, with a purpose built encoder having no picture area limit (or at least capable of handling larger pictures), the whole background may be encoded as a single picture for downloading to the cache.

The first stage where there is an encoder limit on picture size, is to divide the background picture into appropriately sized frames for encoding. As the whole picture is to be reconstructed later, it is important that no data is either lost or duplicated at the boundaries between neighboring frames. The resulting frames are then labelled to retain their respective positions with respect to the whole image. A command file is used during the encoding process to instruct the MPEG encoder how to produce the encoded output, with the particular instructions depending on the encoder used. The pre-processing stage 10 (FIG. 1) requires a series of intra-coded pictures representing each of the frames, and consequently, the encoder command file must specify I-pictures only. Since the picture quality is required to be consistent for all parts of the background image, the command file specifies a fixed quantization level for encoding rather than the more typical fixed bit-rate constraint.

Figure 4:
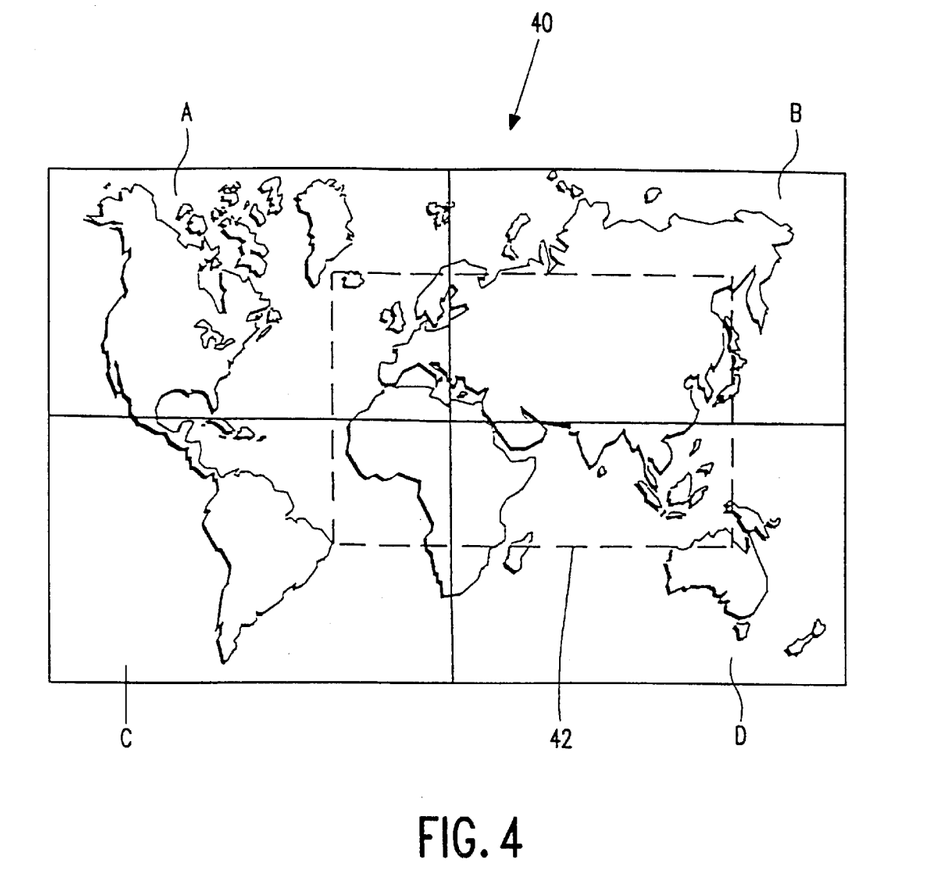
FIG. 4 shows the compilation of a large scrolling background from MPEG pictures.

FIG. 4 illustrates four frames 40A,B,C,D pieced together, and the pre-processing stage will typically extract a screen image from this data as shown by the box of dotted lines 42. In this case, data from all four frames will be used in the final image. Each individual frame that has been independently encoded must be deconstructed and then the constituent data must be reconstructed by the pre-processing stage to produce an intermediate file format in the cache 26 which contains the large single image. The intermediate file format is produced by processing each of the I-pictures in turn, with the pictures being arranged in a particular order for processing. The I-picture order of the incoming picture data is designed so that the picture is formed in rows from left to right and top to bottom.

Each incoming intra-coded frame consists of a layered structure of data, as is described in the MPEG video specification, within which each macroblock is broken down into six blocks, of which the first four contain luminance codes and the last two contain chrominance codes. Intra-coded macroblocks in this application contain no motion information since each macroblock is independently coded. However, due to differential coding where some parameters are carried over from the previous macroblock, problems are caused by the inherent reordering of macroblocks as a result of the enlarged picture size.

Figure 5:
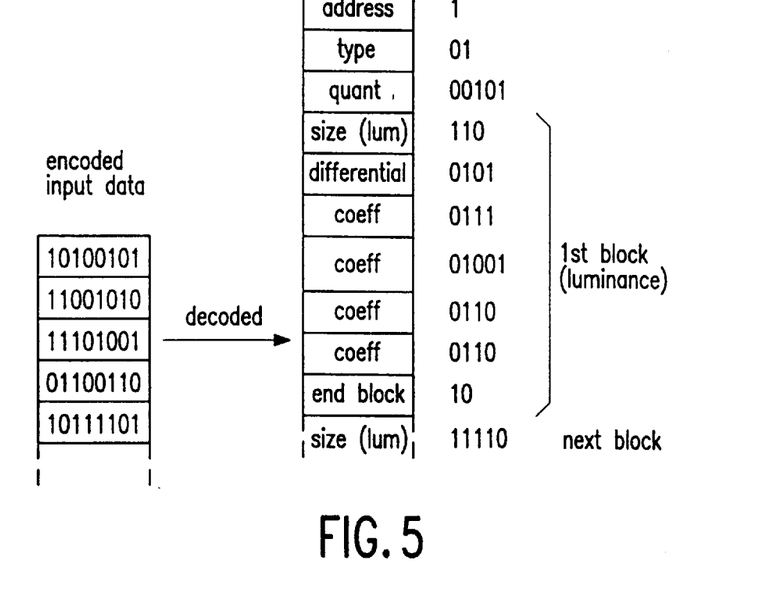
FIG. 5 represents the structure of an intra-coded macroblock.

FIG. 5 shows the structure of an intra-coded macroblock (showing the first of the six blocks) with some example codes. The macroblock has a number of parameters which appear in a certain order. The number of bits that correspond to each parameter is variable and data is to collected bit-by-bit for each parameter and matched against a table of allowed values. Tables of values for each parameter are defined based on the set of codes defined in the MPEG video specification.

A matching algorithm is used to identify the coded value of each parameter by reading in the bits one-by-one and performing a test to check whether the actual number and the number of bits it is represented by correspond to the values in the appropriate parameter table. This is necessary since the code may be defined with a number of preceding zeros. If a match is found, the macroblock decoding moves to the next parameter, until all the coded parameters are read.

Macroblocks are decoded so that they may be more easily manipulated. To allow each macroblock within a picture to be uniquely addressed within, and copied from, the cache 26 (FIG. 1), the macroblocks are formatted to lie neatly within byte boundaries. This may suitably be achieved by adding the appropriate number of bits of stuffing data to the macroblock. The stuffing data is a code which may be included in multiples of 11 bits at the front of the macroblock address code. The code will not affect the decoded image since it will be recognized and ignored by the decoder. During the pre-processing stage when each macroblock is decoded, its size is used to determine the number of stuffing bits (between 0 and 77) that must be added to the front of the macroblock to ensure that the macroblock ends at a byte boundary. The changes to the macroblock coding are made to a copied version in the cache to allow changes to the bit position of the data without affecting the input data. When the decoding of the macroblock is complete, its new representation is stored in the cache along with its size in bytes and also its position with respect to the whole image. The image data may therefore be converted into a new file format that contains size and positional information that allows each macroblock to be independently located and copied as necessary.

As mentioned above, when decoding a picture, some parameters of the previous macroblock are carried over and used to decode the current macroblock. The enlargement of the picture size causes a reordering of the macroblocks. This means that to reconstruct the complete picture, the pre-processing stage must make certain changes to the macroblock codes and two problems arise specifically. Firstly, differential codes are carried between macroblocks which creates discrepancies at the picture boundaries, and secondly the correct macroblock quantization must be set for each macroblock.

As part of the picture encoding process, the amount of data required to represent each macroblock is reduced by coding the DC component of the DCT coefficients differentially. Starting with an initial value (e.g., 128) at each slice header, each DC coefficient is evaluated by adding the differential value stored in the appropriate block of a macroblock. Subsequently, this running value is carried over to the next differential and so on, with differential values being encoded for each of the six blocks within each macroblock.

When encoded frames are combined, the order of the macroblocks is changed, which creates a problem due to disruption in the differential codes that are passed between macroblocks from the end of one line to the start of the next line, causing a corruption in the image. One way of resetting the differential codes that are carried over from previous macroblocks is to introduce a slice header, with the differential values reset to 128. However, this would significantly increase the amount of code required to represent the picture and additional processing would be required to insert a code in the slice header indicating the line position.

An alternative solution is to store the correct DCT coefficient of each macroblock separately such that, for each macroblock at the start of a line, the DCT differentials may be re-evaluated and recoded into the macroblock. This, however, could result in a change to the number of bits contained in the macroblock such that additional work would be required to shift all the macroblock data the required number of bits to accommodate the new codes before adding stuffing data to achieve byte alignment.

A preferred solution is to treat the first macroblock of a line as a special case. As each macroblock must be available to form the first macroblock of a line, and also as a continuation of a macroblock sequence, it is stored in two separate forms in the cache and, in the construction of a picture, the pre-processing stage can access whichever of the two forms is appropriate.

The pre-processing stage therefore scans the input macroblock data twice. The first time around, it evaluates the actual value of each DCT code, with regard to the values carried over from the previous macroblock, and the differentials are then re-evaluated and recoded with respect to the initial value. The macroblock data is then stored along with a slice header with the appropriate quantization value for the macroblock. On the second pass, a separate representation of each macroblock is stored in which the differential values remain unchanged. The two separate representations may then be used by the application program in the formation of a screen image to copy a line at a time, beginning, for example, with a start macroblock followed by 21 continuation macroblocks.

A second problem associated with the reordering of the macroblocks is caused by a change in the macroblock quantization that is passed between successive macroblocks. Once again, this presents different problems when considering macroblocks at the start of a line as opposed to macroblocks in the remainder of a line.

As the macroblocks are decoded in sequence, a value is held of current quantization. This may be changed when slice headers are encountered between macroblocks or when quantization is defined within a macroblock. For macroblocks at the start of a line it is convenient to place a slice header in front of each macroblock and the current quantization is explicitly inserted into the header. This is relatively simple to do during pre-processing because it resets the DCT differential and inserts the correct quantization. More importantly, it also shifts the start of the macroblock by a number of bits (e.g., 6) which would be a time-consuming exercise if done during run-time picture compilation. The insertion of slice headers also permits the macroblock quantization to be deleted from within the macroblock if present. For macroblocks to be used in a continuation of a line, the start macroblock will set the initial quantization, so it is only necessary to change the encoded value if a slice header is present between macroblocks.

Turning now to the construction of frames to be passed to the decoder 14 (FIG. 1), the primary objective is to produce the required valid MPEG picture as quickly as possible. For this reason, as much data as possible is pre-calculated and stored, and on-line construction of frames is achieved by copying the relevant data and amending some parameters.

It is important that for the video frames to play on a target decoder they must satisfy all the constraints imposed by the MPEG video and system specifications. This implies that the frame data not only contains the correct set of macroblocks, but also, all the additional levels of data that carry the timing and multiplex information required so that it can be correctly decoded and presented for display. Consequently, the frame data is wrapped in system and video layers.

Figure 6:
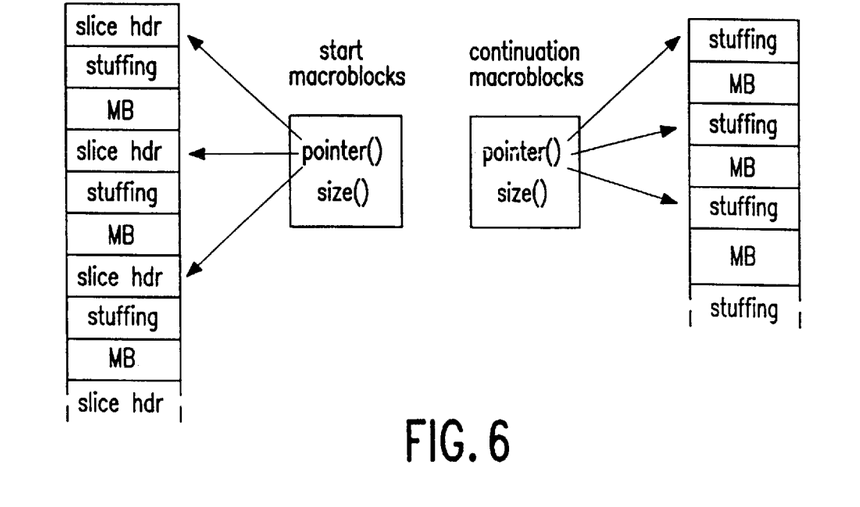
FIG. 6 shows macroblock data formatted for picture compilation.

The frame construction is achieved in two stages: the formation of the video data and the packaging in the system layer. In the first of these, the required macroblock data is selected in response to user input and loaded into buffer 18 from the pre-processed MPEG data stored in the cache. The data is arranged so that it may be copied in blocks, and the size information is used to set up an array of pointers to the start of each macroblock in the picture. This is performed both for the start macroblocks and the continuation macroblocks as shown in FIG. 6. Note the provision of slice headers prior to the stuffing bits and macroblock data for the start macroblocks as described above. As the required image size is known for a given application, additional processing is also performed on the continuation macroblock data to pre-calculate the number of bytes required to copy a line worth of macroblocks.

At run-time, each frame of video data must be compiled to conform to the MPEG video specification, and therefore must have a specific structure. Frames are based on a fixed picture size specified in a sequence header, and additional information carrying the bit-rate and stream information is also supplied. This is preceded by the Group of Pictures (GOP) layer which is not relevant to this application. The picture layer is then used to separate different frames.

Given x and y coordinates for the next picture (determined by the UID input), the macroblock data is copied in lines. At the start of each line is a slice header, as in FIG. 6, which is copied along with the start macroblock, with the rest of the line being copied from the appropriate continuation macroblocks.

Once an MPEG video frame has been compiled in the buffer 18 for display, it must be appropriately packaged so the MPEG decoder 14 can play it. This requires the data to be packaged into bundles of bytes (video disc sectors or packets) as defined by the system layer. Additional information is supplied in packs, which contain timing and data rate information. Each pack is further divided into one or more packets which contain the MPEG data. In this way, a pack may contain packets for different MPEG streams. In addition to the stream ID, the packet headers also contain data size information and may contain timing information instructing the decoder when to start decoding or to present a given frame of data.

A pack header is identified by its start code and appears at the start of each sector. Time stamps supplied in the header allow the decoder 14 to synchronise the arrival of the data contained. The first time stamp of the first pack is set to zero, thereafter successive packs will have time stamps which increase in incremental steps. These values are patched to each pack header as each pack is filled with data. The first pack also contains a system header which contains a variety of information that informs the decoder of the data rates and the operating conditions required to decode the data stream.

The packet header is the lowest level of the system header which contains the data of a particular stream and a specified size. The MPEG data is divided up between the packets of the system layer. Padding packets are also used to fill out the remaining space in the last sector used to store an image. Decoding time stamps (DTS) and presentation time stamps (PTS) are optional time codes of the MPEG standard and tell the decoder when to decode and present the next picture. In this application, they are supplied in the first data packet of the first pack of each frame, with these fields being written at run-time since they depend on the current time stamp and size of the compiled picture.

Assuming a frame size of 22 by 18 macroblocks (which corresponds to 352 by 288 pixels), the first screen image is compiled to correspond to the top left of the complete picture. The first line is compiled from the start macroblock at 0,0 followed by 21 continuation macroblocks from 1,0. The remaining 17 lines are copied in a similar way. The data is formed in the video buffer after being wrapped in the system layer and packaged in sectors.

An important note to make about the system layer for this application is that it can be pre-calculated and stored in memory. During the on-line picture compilation, processing time may be saved by copying the system layer headers directly from memory.

Considering now the scrolling of the background, the mouse position (input from UID 28) is initialised to 0,0 to correspond to the original screen image and a signal is received by the controller 22 via signal line 50 when the decoder 14 has decoded the first picture. If the mouse position changes, the next picture is compiled irrespective of whether the last picture has finished being decoded (i.e., before the signal is received). As long as the number of frames stored does not build up in the buffer 18, the application benefits from a faster update rate as the picture compilation and decoding are allowed to operate in parallel which is appropriate for the smooth scrolling that is desirable.

To provide a relatively high quality encoded background while maintaining a satisfactory update rate, the frame sizes may be reduced by the use of predictive copying. The ability to use P frames relies on the fact that successive frames of the background will be very similar, containing a large quantity of image data from the previous image. Once the first frame is shown, predictive copying using P frames may be used to compile subsequent frames, with some additional data being required depending on the direction of scrolling. The principle difference with regard to the intra frame technique described above is the use of the decoder 14 to copy those macroblocks present in the previous image (and stored in display memory 16).

The image is constructed using a combination of intra-coded macroblocks together with the required macroblock copy commands to retrieve and reposition data from the previous frame. The decoder will use this information to perform the required copying operations to reconstruct the required image. It must be determined how the picture has moved with respect to the last frame and, for each line in the image, whether new data should be added to the front or the end of the line. The appropriate macroblock copy command must be evaluated and padding data added to byte align the coded representation. From one frame to the next, the image may move up, down, left or right or some appropriate combination making up a total of 8 different directions and by a variety of magnitudes. These cases may be handled by 4 separate cases that determine whether the picture has moved.

If the frame has moved up, then the appropriate number of lines of the intra-coded macroblocks corresponding to the new frame position should be used to make up the first lines of the new frame. In this case, the make up of the remainder of the frame will depend on whether the frame has also moved in the horizontal direction.

If the frame has moved horizontally then intra-coded macroblocks must be inserted into each line of the picture. If the frame has moved to the left, then the appropriate intra-coded macroblocks will appear at the start of each line and the end of each line if its has moved to the right. In each case, the remainder of the line is made up of macroblocks from the previous frame. The decoder is instructed to copy this data by a coded sequence which references the other macroblocks of the line and identifies where the data should be copied from. This coded sequence is formulated in real-time.

If the frame has not moved horizontally, then a coded sequence can also be evaluated to copy many lines of data. It is important that this instruction is used in the first line of data, when a slice header must be used to precede the first macroblock.

The final case is when the frame has moved downwards. This is a similar case to moving upwards except that the new intra-coded data is placed at the bottom of the new frame rather than the top.

One complication of using intra-coded macroblocks within P-frames as opposed to I-frames is that the MPEG video specification specifies different codes to indicate the I-frame macroblock types. In order to allow fast macroblock copying it is necessary to have separate representations for macroblocks used as part of P-frames rather than I-frames. This data must be formatted and byte aligned using padding data as before. The program will also need another double set (as before) for start and continuation macroblocks and, in consequence, the required cache memory for a duplicate copy of the whole image will effectively be doubled.

In summary, the real-time compilation and scrolling of MPEG frames is a complex task which involves encoding, pre-processing, real-time picture generation and control for display. The image data is prepared so that it can be accessed and copied quickly. The pre-processing stage acts as a simplified high speed encoder and multiplexer in which each frame is produced as part of a data stream at high speed still conforming to the MPEG 1 video and system layer specifications.

From reading the present disclosure, other modifications will be apparent to persons skilled in the art. Such modifications may involve other features which are already known in the design, manufacture and use of interactive image display equipment and component parts thereof and which may be used instead of or in addition to features already described herein. Although claims have been formulated in this application to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of features during the prosecution of the present application or of any further application derived therefrom.

We claim:

1. Interactive image manipulation apparatus having an input for discrete cosine transform (DCT) coded macroblocks of pixel data and comprising:

an image data cache;

a pre-processing controller for processing received macroblock data, said pre-processing controller generating at least two independent representations of each macroblock for use as a first or a continuation macroblock, respectively, in a line of macroblock data in an assembled image, storing said representations in the image data cache, and generating a DCT coded image from selected ones of said representations read from the image data cache;

user input means coupled to the preprocessing controller, the selection of stored macroblock representations in the generated image being at least partially determined by input from the user input means; and a decoder for receiving and decoding the generated DCT coded image.

2. Apparatus as claimed in claim 1, further comprising a display coupled with said decoder and operable to receive and display the decoded image.

3. Apparatus as claimed in claim 1, wherein the pre-processing controller is arranged to generate said DCT coded image as a foreground and background pair of pixel planes, and to assign each selected macroblock representation to one of said planes.

4. Apparatus as claimed in claim 3, wherein an image sprite defined in one or more macroblocks of pixel data is stored in the cache, and the user input means is configured to generate positional signals in response to user input, the pre-processing controller is operable to position the sprite in one of the pixel planes of the image at a location therein determined by the positional signals.

5. A method for interactive manipulation and decoding of DCT coded macroblocks of pixel data comprising the steps:

pre-processing the coded macroblock data to generate a database of macroblock data containing at least two independent representations of each macroblock for use as a first or a continuation macroblock, respectively, in a line of macroblock data in an assembled image;

assembling a DCT coded image from selected ones of said macroblock representations, the selection of macroblock representations forming the image being made at least partially in response to user input; and DCT decoding the assembled image.

6. A method as claimed in claim 5, wherein the step of pre-processing includes bit-stuffing such that each macroblock representation comprises an integer number of data bytes.

7. A method as claimed in claim 5, wherein the DCT coded image is assembled as overlaid foreground and background image planes with the selected ones of said macroblock representations being assigned to respective ones of the image planes, and the location of one or more of said macroblocks in one of the image planes being determined by user input.

8. A method as claimed in claim 5 in which, where the DCT coded macroblock data comprises a plurality of pictures providing respective portions of a larger background image, the step of pre-processing includes compilation of said pictures to recreate said background image, and the selected ones of said macroblock representations used in the step of assembling a DCT coded image are those within a window identifying a selected portion of said background image.

9. A method as claimed in claim 8, wherein the user input specifies a direction of movement and the window is moved relative to said background image in response thereto.

* * * * *